United States Patent [19]

Hisaminato et al.

[11] Patent Number: 4,659,139
[45] Date of Patent: Apr. 21, 1987

[54] ROOF STRUCTURE FOR VEHICULAR SUN-ROOF DEVICES

[75] Inventors: Takahiro Hisaminato, Asaka; Haruo Watanabe, Niiza, both of Japan

[73] Assignee: Honda Giken Kogyo Kabushiki Kaisha, Tokyo, Japan

[21] Appl. No.: 600,818

[22] Filed: Apr. 16, 1984

[30] Foreign Application Priority Data

May 11, 1983 [JP] Japan ............................ 58-70363[U]

[51] Int. Cl.⁴ .............................................. B60J 7/02
[52] U.S. Cl. .................... 296/210; 296/213; 296/216
[58] Field of Search ............... 296/213, 215, 216, 218, 296/221, 222, 210

[56] References Cited

U.S. PATENT DOCUMENTS 4,328,990  5/1982  Yoshida ........................... 296/222
4,368,915  1/1983  Torii .................................. 296/213
4,416,487  11/1983  Hirotani et al. .................. 296/216 X

FOREIGN PATENT DOCUMENTS 0053922  5/1981  Japan ................................ 296/210
0157617  12/1981  Japan ................................ 296/216

Primary Examiner—Robert B. Reeves
Assistant Examiner—Russell D. Stormer
Attorney, Agent, or Firm—Birch, Stewart, Kolasch & Birch

[57] ABSTRACT

A roof structure for a vehicular sun-roof device is provided including a roof panel having an upper and lower face and an opening therein. A downwardly bent extension projects downward from the roof panel. A stiffener is mounted between the downwardly bent extension and the lower face of the roof panel. A marginal opening edge is formed by the downwardly bent extension and the stiffener and includes a lower end. A sun-roof frame is operatively positioned and affixed adjacent to and spaced from the marginal opening edge. A seal is provided attached to the lower end of the marginal opening edge for abutting against the sun-roof frame to close the space between the marginal opening edge and the sun-roof frame. The roof structure reduces the space necessary to support a sun-roof device thereby increasing the area of the opening in the roof panel.

4 Claims, 3 Drawing Figures

4,659,139

ROOF STRUCTURE FOR VEHICULAR SUN-ROOF DEVICES

BACKGROUND OF THE INVENTION

Field of the Invention

The present invention relates to a sun-roof device for vehicles and, more particularly, to an improvement in a roof structure wherein the opening area is enlarged.

SUMMARY AND OBJECTS OF THE INVENTION

The present invention permits an opening in a vehicular sun-roof device to be remarkably enlarged while still functioning as an effective sun-roof.

According to the present invention, a flange of a conventional sun roof frame can be eliminated. Moreover, it is possible to provide a roof structure for a sun-roof device with a variety of advantages including an advantage in that the construction can be simplified. In addition, the assembly can be markedly improved by the feasibility in the welding operation with the bracket as well as by the simplified construction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
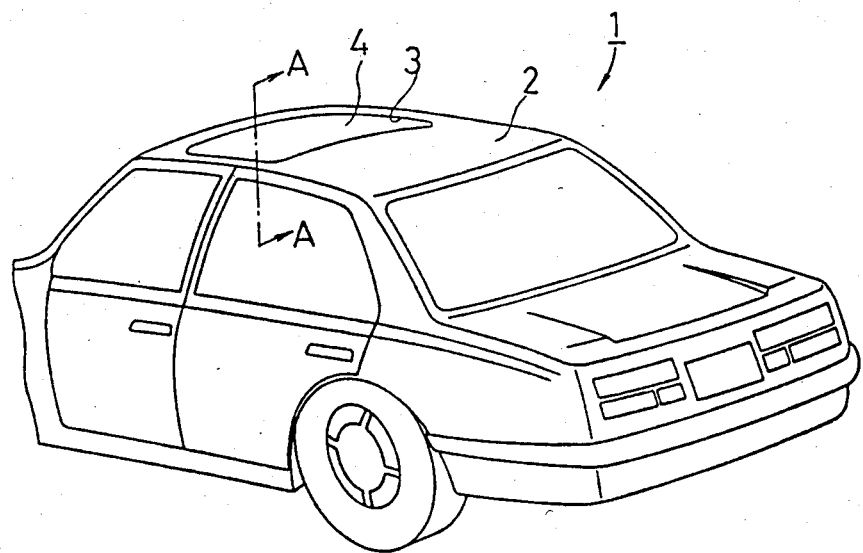
FIG. 1 is a partial perspective back view of a vehicle.

As shown in FIG. 1, a vehicle 1, such as a four-wheeled automobile, is formed with an opening 3 in a roof 2 and is equipped with a sun-roof device for opening or closing the opening 3. The sun roof device includes a sliding roof panel 4, such as a glass plate, which is slidable back and forth along, for example, guide rails.

Figure 3:
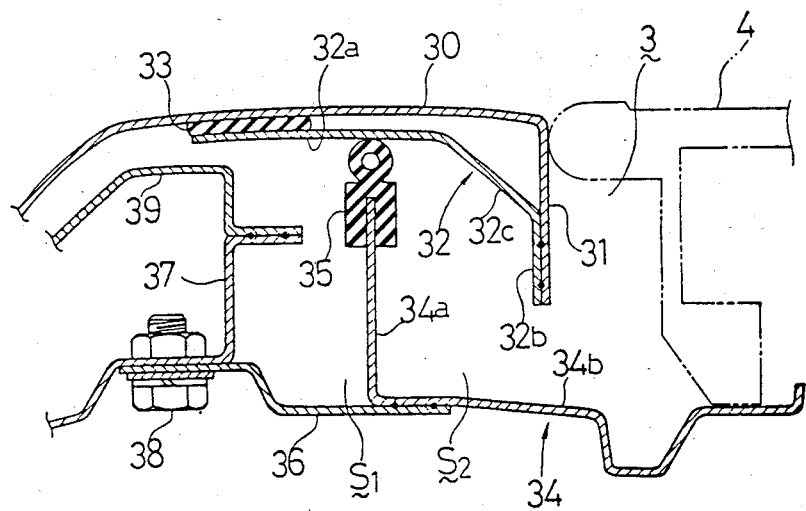
FIG. 3 is a section taken along line A—A of FIG. 1 and showing the roof structure of the prior art.

As illustrated in FIG. 3, the construction of a sun-roof device in the vicinity of the opening 3 is made in accordance with the prior art. A roof panel 30 is formed with a downwardly bent extension 31 bent downward generally at a right angle to define the afore-mentioned opening 3. A roof stiffener 32 is attached over the inner faces of the roof panel 30 and the bent extension 31 to reinforce the roof panel 30 and the bent extension 31. More specifically, an upper stiffener portion 32a positioned adjacent to the roof panel 30 extends generally in parallel with the inner face of the roof panel 30. A lower stiffener portion 32b at the bent extension 31 is made coextensive with and secured to the lower portion of the bent extension 31 by a spot welding method or the like. Moreover, the intermediate stiffener portion 32c is bent to provide a sloped face thereby to enhance the rigidity. As a result, there is formed between the intermediate stiffener portion 32c and the half panel 30 a space which has substantially a triangular section as shown in FIG. 3.

A sun-roof frame 34 is formed with a vertical flange 34a. On the upper end of the flange 34a, a seal rubber 35 is fitted which has a predetermined elasticity. The upper end of the seal rubber 35 is held in abutting contact with the lower face of the upper portion 32a of the afore-mentioned stiffener 32. The lower end of the flange 34a is formed with a frame member 34b which is bent to extend generally horizontally toward the opening 3. Moreover, the sun-roof frame 34 has its lower portion supported on a bracket 36, which is fastened by bolt-nut means 38 to a roof side rail 37 which is disposed inside of the side portion of the roof panel 30 The roof side rail 37 has its upper portion attached to and integrated with the lower portion of an outer panel 39.

The afore-mentioned slide roof panel 4, as indicated by phantom lines, is slidably guided while having its side end and its lower end regulated by the afore-mentioned bent extension 31 and the afore-mentioned sun-roof frame 34, respectively.

In the construction thus far described, the afore-mentioned bent extension 31 is disposed in a position to bridge over the flange 34a of the sunroof frame 34, and the roof stiffener 32 requires a space for accommodating the flange 34a disposed inside of the inner side of the bent extension 31. This construction presents a disadvantage in that the opening 3 cannot have its area enlarged because of the restrictions upon both the spaces $S_1$ and $S_2$ of the flange 34a and intermediate portion 32c of the stiffener 32, respectively, from the side ends of the outer panel 39 and the roof side rail 37, as shown in FIG. 3.

The present invention has an object to provide a roof structure for a vehicular sun-roof device, which eliminates the disadvantage thus far described and permits an enlarged area of the roof opening while still performing an effective sun-roof function and enjoying an excellent assembly.

In order to achieve the above object, the present invention provides a roof structure for a vehicular sun-roof device wherein a marginal opening portion is formed of both an extension bent downwardly of an opening formed in a roof panel and a stiffener mounted between said downwardly bent extension and the lower face of said roof panel. A lower end of a seal rubber attached to the lower portion of the marginal opening edge is constructed to abut against the upper face of a sun-roof frame which is fixed below said opening.

The present device will be described in detail in the following description in connection with a more specific preferred embodiment thereof with reference to the drawings.

Figure 2:
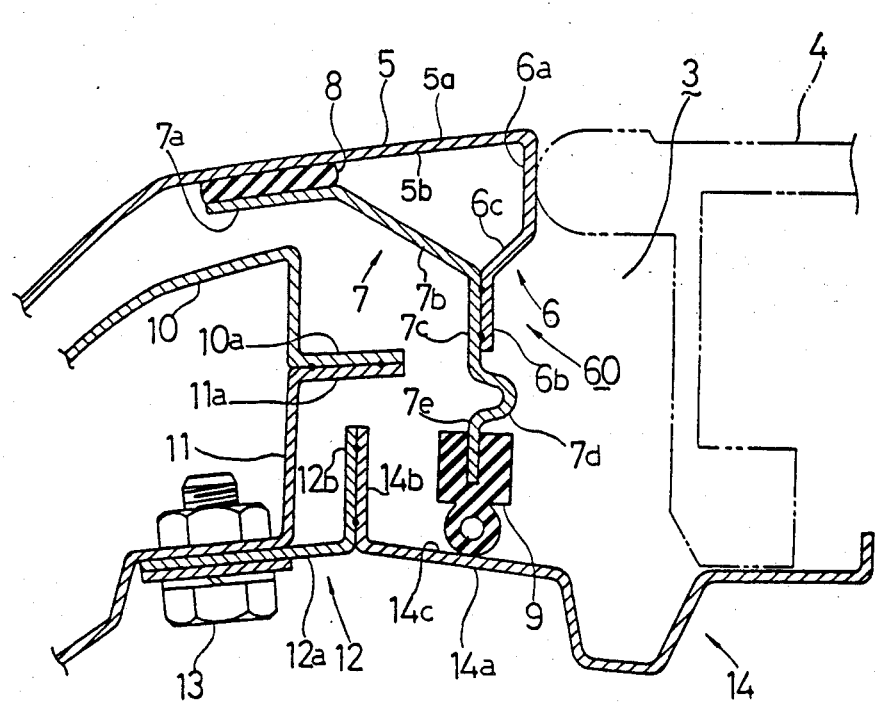
FIG. 2 is a section taken along line A—A of FIG. 1 and showing the roof structure according to the present invention.

FIG. 2 is a section taken along line A—A of FIG. 1 illustrating a roof structure according to the present device.

A roof panel 5 includes an upper face 5a and a lower face 5b and a vehicular inside portion bent downward generally at a right angle to form a downwardly bent extension 6 defining the afore-mentioned opening 3. Incidentally, the bent extension 6 is composed of an upper portion 6a and a lower portion 6b and is bent back in between toward the roof panel 5 to form a stepped portion 6c.

On the other hand, a roof stiffener 7 is additionally formed to extend over the inner faces of both the roof panel 5 and the bent extension 6 to reinforce them thereby to enhance their rigidity. In this additional formation, the upper stiffener portion 7a at the roof panel 5 is extended generally in parallel with the roof panel 5 and is fixed thereon, for example, by means of a sealer 8. Moreover, the upper stiffener portion 7a is bent at the side of the afore-mentioned bent extension 6 downwardly at an inclination to form an intermediate stiffener portion 7b, which has its lower end bent generally vertically downward to form a deposited portion 7c. This deposited portion 7c is extended along the afore-mentioned lower portion 6b of the bent extension and is secured, for example, by a spot welding method. Moreover, the lower end of the deposited portion 7c is made to bulge toward the opening 3 to form a bulge portion 7d, which includes a lower end extend.ing generally vertically downward to form a lower end 7e for mounting a seal rubber 9. The formation of the bulge portion 7d makes it possible to accurately position the deposited portion 7c of the afore-mentioned stiffener 7 and the lower portion 6b of the bent extension 6, when they are to be assembled, to enhance the rigidity of the stiffener 7. The bent extension 6 forms a marginal opening edge 60 together with the deposited portion 7c of the stiffener 7 and the lower end 7e to be secured thereto.

Incidentally, the seal rubber 9 has a predetermined elasticity and includes an upper end notch crowning the lower end 7e of the stiffener 7.

An outer panel 10 is disposed inside of the side portion of the roof panel 5 and includes a lower portion integrated with the upper portion of a roof side rail 11. This integration is achieved by using transversely extending flanges 10a and 11a which are formed at the outer panel 10 and the roof side rail 11, respectively. A horizontal mounting portion 12a of a roof side bracket 12 is fastened to the lower face of the roof side rail 11 by bolt-nut means 13. The leading end of the bracket 12 at the side of the opening 3 is bent generally vertically upward to form a flange 12b.

A sun-roof frame 14 is composed of a generally horizontal frame portion 14a and a flange portion 14b bent generally vertically upward from the outer end of the frame portion 14. The flange portion 14b is provided to be joined to the flange 12b of the afore-mentioned bracket and has a relatively small length. Moreover, the lower end of the afore-mentioned seal rubber 9 is held in abutting (or elastic) contact with the generally horizontal face 14c of the frame portion 14a to shut off the inside and outside spaces The afore-mentioned slide roof panel 4 is slidably guided like the prior art of FIG. 3 while having its side end and lower end regulated by the afore-mentioned bent extension 6 and sun-roof frame 14, respectively.

In the embodiment thus far described, therefore, the shut-off function is effected by mounting the seal rubber 9 on the lower end of the roof stiffener 7 deposited on the downwardly bent portion 6 at the side of the roof panel and by holding the seal rubber 9 in abutting contact with the face of the sun-roof frame 14. As a result, the flange 34a of the prior art construction shown in FIG. 3 at the side of the sun-roof frame can be eliminated to completely eliminate both the space $S_1$ of the flange 34a inside of the roof panel 5 and the space $S_2$ of the intermediate portion 32c of the stiffener, which is restricted by that flange 34a.

In the embodiment thus far described, moreover, the seal rubber 9 is mounted on the lower end of the roof stiffener 7. As an alternative, a similar effect can be attained if the lower end of the bent extension 6 is further extended to mount the seal rubber 9 thereon. In addition, the illustrated embodiment is directed to a sliding roof panel 4, however, the present invention may be applied to a detachable type sun-roof device which is vertically opened or closed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A roof structure for a vehicular sunroof device comprising:
    a roof panel having an upper and lower face and including an opening therein;
    a downwardly bent extension projecting downward from said roof panel;
    a stiffener mounted between said downwardly bent extension and the lower face of said roof panel;
    a marginal opening edge being formed by said downwardly bent extension and said stiffener and including a lower end;
    a sun-roof frame affixed adjacent to and spaced from said marginal opening edge, said run-roof frame including a flange extending upwardly therefrom and a generally horizontal frame portion extending beneath said lower end of said marginal opening edge;
    a roof side bracket including a flange extending upwardly therefrom and being affixed to said flange of said sunroof frame to form a first affixed portion;
    an outer panel provided adjacent to said roof panel and including a transversely extending flange;
    a roof side rail mounted adjacent to said outer panel and including a transversely extending flange affixed to said flange of said outer panel to form a second affixed portion;
    said first affixed portion being located below said second affixed portion; and
    seal means attached to said lower end of said marginal opening edge for abutting against said generally horizontal portion of asid sun-roof frame to close the space between said marginal opening edge and said sun-roof frame.

2. A roof structure for a vehicular sun-roof device according to claim 1, and further including a sealer disposed between said stiffener and the lower face of said roof panel.

3. A roof structure for a vehicular sun-roof device according to claim 1, wherein said stiffener includes a bulge for accurately positioning said stiffener relative to said roof panel.

4. A roof structure for a vehicular sun-roof device according to claim 1, wherein said seal means is a rubber seal having an end notch for engaging said lower end of said marginal opening edge.

* * * * *